G. L. NEWTON.
PEANUT HARVESTER.
APPLICATION FILED MAY 21, 1920.
1,389,526.
Patented Aug. 30, 1921.
2 SHEETS—SHEET 1.
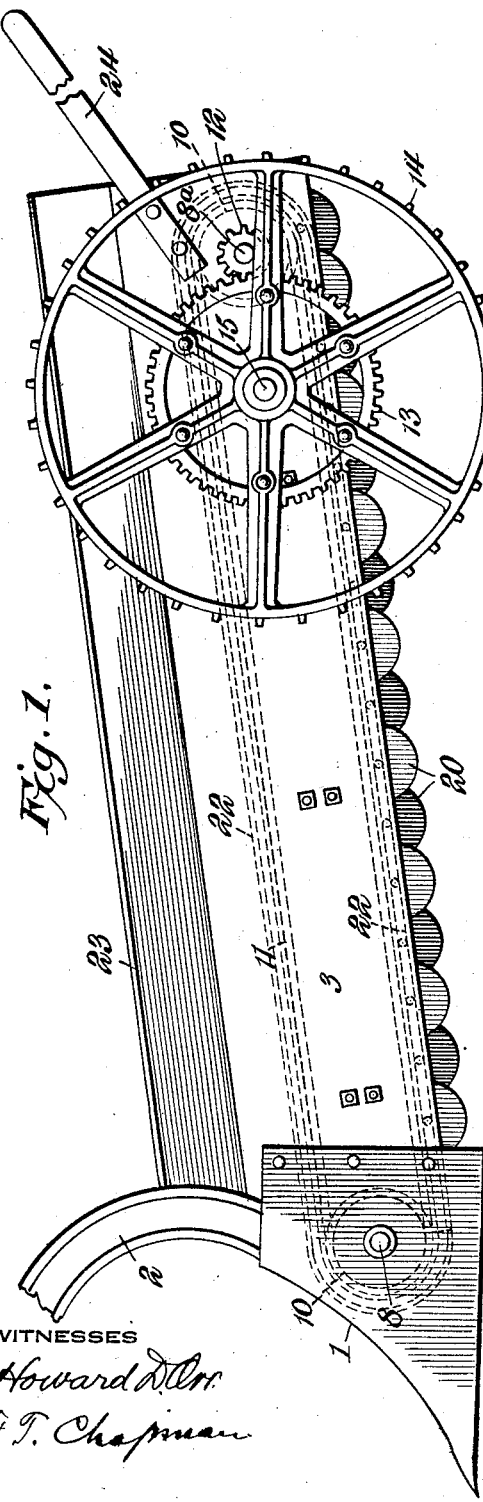
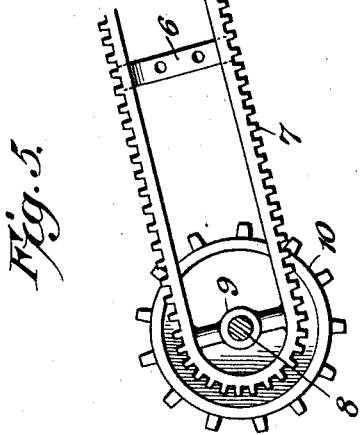
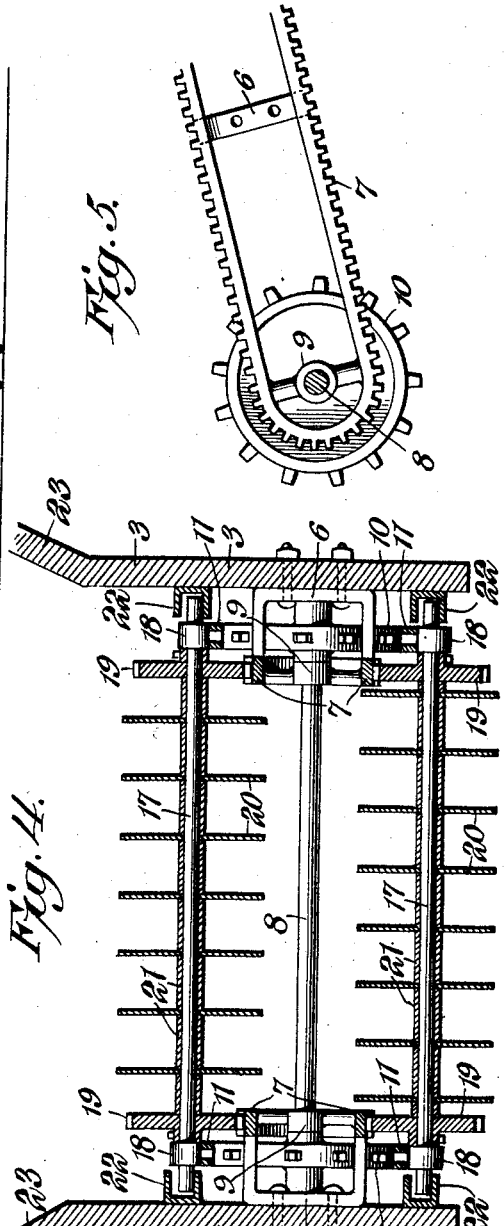
George L. Newton, INVENTOR,
WITNESSES
BY
ATTORNEY

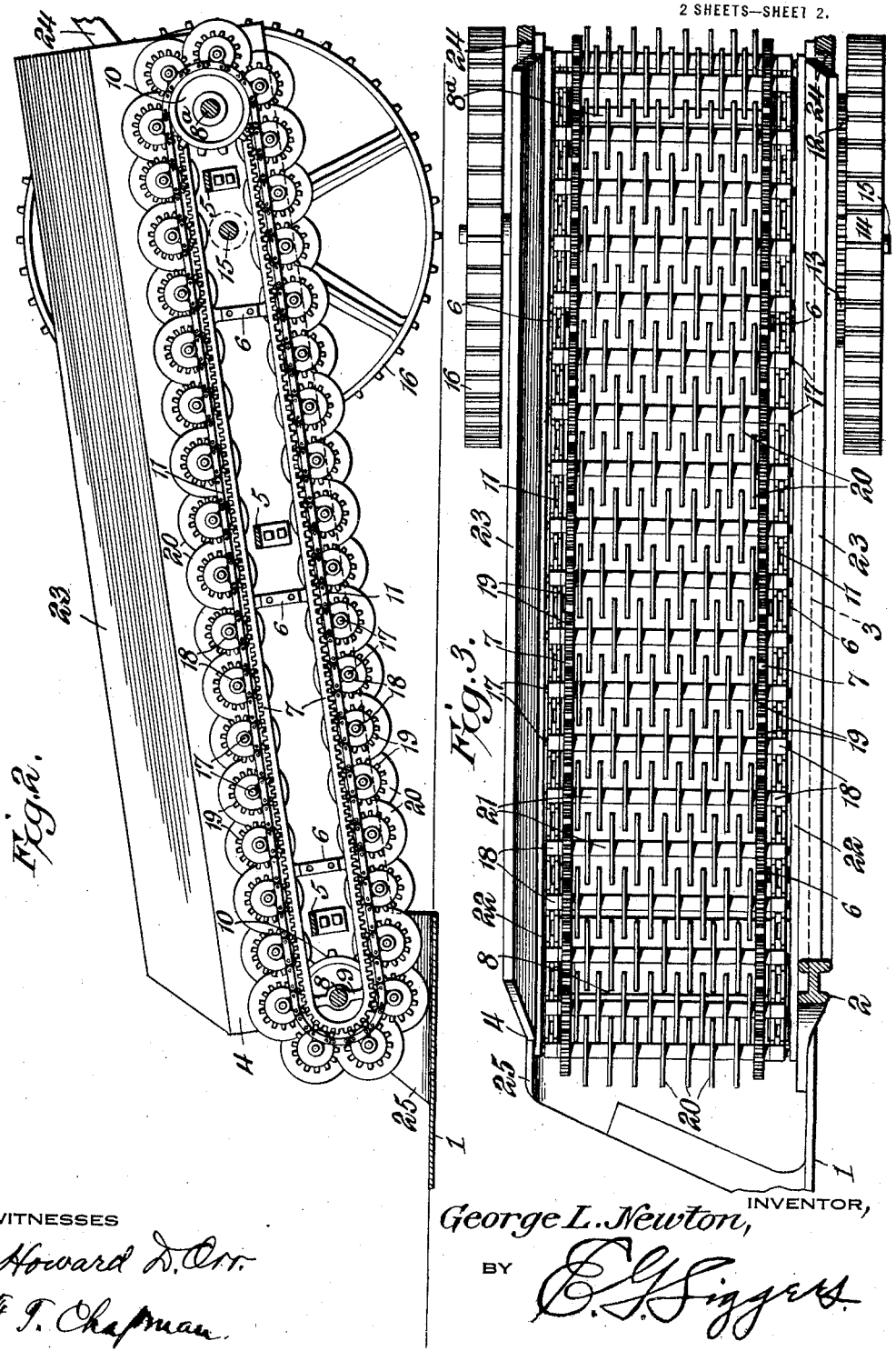

UNITED STATES PATENT OFFICE.

GEORGE L. NEWTON, OF MACHEN, GEORGIA.

PEANUT-HARVESTER.

1,389,526.  Specification of Letters Patent.  Patented Aug. 30, 1921.

Application filed May 21, 1920. Serial No. 383,111.

*To all whom it may concern:*

Be it known that I, GEORGE L. NEWTON, a citizen of the United States, residing at Machen, in the county of Jasper and State of Georgia, have invented a new and useful Peanut-Harvester, of which the following is a specification.

This invention has reference to peanut harvesters and is an improvement upon the peanut harvester shown and described in my Letters Patent, 1,293,170, granted February 4, 1919, for a peanut harvester.

In the said Letters Patent, the peanuts are taken from the ground by a plow structure and deposited upon the lower end of a slanting traveling conveyer, including series of disks so arranged as to travel on an incline and at the same time rotate in a manner to cause the excavated peanuts, with the vines to which they are attached, to be freed from clinging dirt or soil. The object of this invention is to more thoroughly free the excavated peanuts from the clinging dirt than heretofore and to provide a more efficient and better mechanism for the purpose.

In accordance with the invention, there is provided a structure having at its forward end a plowlike device designed to enter the ground and lift the peanuts therefrom, and such peanuts are deposited upon a conveyer comprising traveling series of groups of disks arranged in alternation, or interspersed relation with the disks of each series of disks mounted in axially spaced relation to each other upon a shaft. The several shafts are connected near their ends to drive chains to provide an endless conveyer, and associated with the shafts and chains, are endless racks so disposed that each shaft with its series of disks is rotated on its longitudinal axis and is at the same time propelled from the front or receiving end of the harvester toward the rear end thereof, the shafts rotating in the direction of travel of the conveyer. The harvester is supported at the forward end by a plow structure and at the rear end by traction wheels of which one may constitute a driving wheel suitably geared to the conveyer to cause the desired upward movement of the upper run of the conveyer as the machine is traveling forwardly.

The invention will be best understood from a consideration of the following detailed descriptions taken in connection with the accompanying drawing, forming a part of this specification, with the understanding, however, that the invention is not confined to any strict conformity with the showing of the drawings, but may be changed or modified so long as such changes or modifications mark no material departure from the salient features of the invention as expressed in the appended claims.

In the drawings:—

Figure 1 is a side elevation of a peanut harvester embodying the invention, the plow beam being broken away.

Fig. 2 is a longitudinal section of the structure shown in Fig. 1, omitting certain parts.

Fig. 3 is a plan view of the structure shown in Fig. 1 with some parts in section.

Fig. 4 is a cross section of the structure drawn on a larger scale than the preceding figures and omitting distant parts.

Fig. 5 is a detailed view of the lower or forward end of one of the rack bars and also showing one of the supporting sprockets for a corresponding one of the conveyer chains.

Referring to the drawings, there is shown a plow 1 provided with a plow beam 2 and secured to the forward end of slanting sideboard 3 arranged at one side of the machine, which latter is provided with another sideboard 4 on the opposite side of the machine from the board 3. The two boards, 3 and 4, are connected together in any appropriate manner, as by crossbeams 5.

Connected to each board, 3 and 4, are brackets 6 carrying elongated endless racks 7, spaced suitably from the respective sideboards by the brackets 6 to accommodate certain mechanism. The ends of each rack are curved about an axis individual thereto, and in said axes there are mounted shafts 8 and $8^a$ respectively, having journal bearings 9 carried by the appropriate portions of the respective rack bar 7.

At each end of each shaft 8 and $8^a$ there is secured a sprocket wheel 10 with the sprocket wheels on the respective sides of the machine in a plane extending in the direction of the length of the machine, with the sprocket wheels carrying sprocket chains 11. The rack bars 7 are each arranged on an incline, the sideboards 3 and 4 being similarly arranged, whereby the plow end of the machine is low, so that the plow may enter the ground for an appropriate distance, while the other, or rear end of the machine, is elevated.

The rear, elevated, end of the machine is traversed by the shaft 8ª, and fast to this shaft, outside of the sideboard 3, is a gear pinion 12 meshing with a gear wheel 13, secured to a traction wheel 14, mounted on a shaft or axle 15, extending through the sideboard 3 to and through the other sideboard 4, outside of which latter the shaft 15 carries another traction wheel 16. The two traction wheels 14 and 16 are not or need not be connected for simultaneous rotation, for one or both of the traction wheels may be loose on the shaft or axle 15, such arrangement facilitating turning of the machine and ready diversion of the machine while traveling over a field or elsewhere.

The arrangement is such that when the machine is traveling over the field the traction wheel 14 through the gear wheel 13, causes rotation of the pinion 12 and shaft 8ª with corresponding travel of the sprocket chains 11. Connected to the chains 11 are shafts 17 journaled near the ends in brackets 18 fast to the chains 11. Each shaft 17 has fast to it near each end a gear wheel 19, meshing with the corresponding rack bar 7 so that as the chains 11 travel, the shafts 17 are caused to rotate.

Mounted on each shaft 17 is a series of disks 20, held apart by spacing sleeves 21 and the disks on each shaft alternate and are interspersed with those of the neighboring shafts. The end portions of each shaft 17 are continued beyond the sprockets 18, and there enter guide channels 22 fast to the inner faces of the respective sideboards 3 and 4, thereby holding the gear wheels 19 at all times in mesh with and properly related to the rack bars 7. Each channel 22 is continuous, or endless, so as to support the shafts 17 throughout their full course of travel.

The sideboards 3 and 4 have flaring extensions 23, continued from the front or plow end of the machines to the rear end thereof to accommodate peanut vines lifted from the ground. At the rear end of the sideboards, guiding handles 24 are secured.

In the harvesting operation, the machine may be drawn over the field by draft animals or by mechanical means, with an operator preferably directing the machine by means of handles 24. The plow 1 is caused to enter the ground sufficiently to lift vines and peanuts therefrom, and the peanuts reach the upper run of the conveyer where they are engaged by the disks 20, such disks traveling bodily from the front to the rear of the machine and also rotating in the same direction. The series of disks are geared up to the driving wheel in such manner that the conveyer moves fastener from front to rear of the machine than the latter travels over the ground. This is advantageous, since the fresh soil being loose the disks would otherwise bed into the soil, thereby choking the machine, and the peanuts are not then delivered onto the carrier as fast as they are plowed up. The machine has a further advantage in that it may be turned about in the field within a very small space, the plow and frame being rigidly fastened together. Moreover, by using a turned up portion 25 on the side of the plow structure opposite the point of the plow the soil is cut and delivered unto the conveyer to better advantage than is obtained when the turned up portion is omitted.

What is claimed is:—

1. A peanut harvester comprising a body portion with a plow structure at one end and an inclined elevator conveyer leading therefrom to the other end, said conveyer comprising an endless series of axially rotatable linearly movable carrying devices for the peanuts lifted from the ground by the plow.

2. A peanut harvester comprising an elongated body member with a plow structure at one end and an endless series of rotatable disks constituting a support for the peanuts removed from the ground by the plow, said endless support having means for imparting to it a progressive movement other than its bodily movement with respect to the ground over which the machine travels.

3. A peanut harvester comprising a supporting structure, a plow at one end of the structure for entering the ground, and an endless carrier inclined from the plow to receive and convey peanuts extracted from the ground by the plow, said carrier comprising connected series of laterally spaced disks with means for rotating the disks about their axes, and means for imparting progressive movement to the connected series of disks.

4. A peanut harvester comprising an inclined frame, a plow at the low end of the frame to enter the ground and extract peanuts therefrom, and an inclined endless conveyer rising therefrom toward the rear of the harvester, the conveyer including a series of laterally extended shafts connected together for simultaneous bodily movement, each shaft having thereon a series of laterally spaced disks with the disks of each shaft alternating with those of the neighboring shafts, gear wheels on each shaft, and endless rack bars with which the gear wheels mesh.

5. A peanut harvester comprising a body portion with a plow at the forward end, an inclined endless conveyer rising from the end of the plow toward the rear end of the harvester, with the conveyer including a series of laterally disposed shafts, each with disks thereon spaced apart lengthwise of the shafts, gear wheels fast to the end portions of the shafts, endless rack bars meshing with the gear wheels, and endless guide channels entered by and supporting the ends of the shafts.

6. A peanut harvester provided with means for extracting peanuts from the ground while the harvester is traveling over the ground, and including an endless conveyer with its supporting surface made up of series of rotatable disks traveling both rotatively and linearly.

7. A peanut harvester provided with means for extracting peanuts from the ground while the harvester is traveling thereover and comprising a conveyer including rotatable disks connected together and mounted to travel in an endless series on and with the machine, the disks rotating at a greater speed than the linear speed of the conveyer.

8. A peanut harvester comprising a framework with a plow at the forward end, an inclined endless conveyer rising from the plow toward said conveyer including a series of laterally disposed shafts each provided with disks spaced apart on the shafts, gear wheels connected to each shaft, guide channels on the framework supporting and guiding said shafts, and rack bars fast to the framework and meshing with the gear wheels of the shafts, whereby the disks travel both rotatively and linearly.

In testimony that I claim the foregoing as my own, I have hereto affixed my signature.

GEORGE L. NEWTON.

Witnesses:
T. C. TUCKER,
Mrs. R. E. SHINER.